United States Patent [19]

Kuribara et al.

[11] Patent Number: 5,018,899
[45] Date of Patent: May 28, 1991

[54] YOKE FOR UNIVERSAL JOINT AND MANUFACTURING METHOD THEREFOR

[75] Inventors: Ritsuo Kuribara; Kiyoshi Okubo; Koichi Yokoi, all of Maebashi; Kiyoshi Sadakata, Gunma, all of Japan

[73] Assignee: Nippon Seiko Kabushiki Kaisha, Tokyo, Japan

[21] Appl. No.: 546,945

[22] Filed: Jul. 2, 1990

[30] Foreign Application Priority Data

Jul. 7, 1989 [JP] Japan .................. 1-174066

[51] Int. Cl.⁵ .............................. F16D 3/00
[52] U.S. Cl. .................... 403/57; 403/157; 464/134; 29/175.1
[58] Field of Search .......... 403/373, 157, 57; 29/175.1; 464/134; 72/379.2

[56] References Cited

U.S. PATENT DOCUMENTS 4,361,024 11/1982 Haldric ........................ 403/373 X
4,505,608 3/1985 Haldric ........................ 29/175.1 X
4,646,552 3/1987 Kanbe ......................... 29/175.1 X Primary Examiner—Andrew V. Kundrat
Attorney, Agent, or Firm—Shapiro and Shapiro

[57] ABSTRACT

A yoke for universal joint is composed of a cylindrical coupling tube formed by pressing a metal plate and having a slit in a radial direction and serrate grooves on the internal periphery; a pair of flanges integrally formed at an end of the coupling tube and positioned on both sides of the slit; and a coupling arm formed by pressing a metal plate. One of the flanges has a screw hole, while the other flange has a hole, coaxial with the screw hole, for passing a bolt to be screwed into the screw hole. The coupling arm has a penetrating hole in the base portion, and mutually coaxial circular holes at its opposite ends. The yoke is assembled by fitting the other end of the coupling tube into the penetrating hole in the base portion, and connecting the other end of the coupling tube with the base portion of the coupling arm.

4 Claims, 3 Drawing Sheets

YOKE FOR UNIVERSAL JOINT AND MANUFACTURING METHOD THEREFOR

BACKGROUND OF THE INVENTION

1. Field of the Invention

The present invention relates to a yoke for a universal joint adapted for use for example in the steering device of an automobile for transmitting the movement of the steering column to the steering gear, and a manufacturing method therefor.

2. Related Background Art

The steering device of an automobile is constructed, for example, as shown in FIG. 5.

The movement of a steering wheel 1 is transmitted through a steering shaft 2 and a connecting rod 3 to steering gears 4 which steer the wheels of the automobile.

Because, the steering shaft 2 and the input shaft 5 of the steering gears 4 cannot, in general, be mutually aligned, the connecting rod 3 is usually provided between two shafts 2, 5 and the ends of said connecting rod 3 are connected to the ends of said shafts 2, 5 through universal joints 6, 6 whereby the movement transmission is enabled between the mutually unaligned shafts 2 and 5.

The universal joint 6 incorporated in such power transmission mechanism is conventionally composed, as shown in FIG. 6, of first and second yokes 7, 8 of bifurcate form, and a cross-shaped shaft 9 for movably combining said yokes 7, 8.

In the universal joint shown in FIG. 6, since each yoke is prepared by pressing a metal plate as disclosed in the Japanese Patent Application No. 63-185222, the positional relationship between the coupling arms for supporting the cross-shaped shaft 9 and the flange (to be tightened with a bolt for connecting the yoke for example to the end of the connecting rod 3 is not adjustable but is always fixed. Consequently, the fixation of the bolt on the flange becomes sometimes difficult in certain conditions of use.

For avoiding such drawback, there is already known a structure, as shown in FIGS. 7 and 8, composed of a combination of a coupling tube 10, coupling arms 11 and a clamping member 12.

The coupling tube 10 is formed by drawing a metal pipe, and is provided with a slit 13 in a radial direction and serrate grooves 14 on the internal periphery, both formed by suitable mechanical working.

The coupling arms 11 are formed by pressing a metal plate in U-shaped form, which is provided with a hole 15 at the base portion, and mutually coaxial circular holes 16, 16 at both ends.

The clamp member 12 is formed by forging and then mechanically working a metal material, and is provided with a screw hole 17 at an end and a hole 18 at the other end for passing a bolt (not shown) to be screwed into said screw hole 17.

The above-mentioned members 10, 11, 12 are combined by fitting the clamp member 12 on an end of the coupling tube, fitting the hole 15 at the base portion of the coupling arms 11 on the other end of the coupling tube 10, and welding the fitted portions, thereby completing a yoke 7 (or 8) for the universal joint.

When such yoke 7 (or 8) is connected to the end for example of the connecting rod 3 (FIG. 5), a serrate portion formed on said end portion of the connecting rod is inserted into the coupling tube 10 while the bolt fitted into said clamp is loosened, and said bolt is then tightened. Thus the yoke 7 (or 8) is firmly coupled to the end of the connecting rod 3.

However, the above-explained yoke of the conventional universal joint has the drawbacks of requiring many (three) component parts and also requiring different methods of preparation for said component parts (drawing for the coupling tube 10, pressing for the coupling arms 11 and forging for the clamp member 12) with a large number of working steps, whereby the manufacturing cost is inevitably increased.

SUMMARY OF THE INVENTION

An object of the present invention is to provide a yoke for universal joint, composed of a reduced number of component parts, which can all be prepared by pressing.

Another object of the present invention is to provide a method for producing a yoke for universal joint, with a reduced number of working steps.

The yoke of the present invention for universal joint is composed of a cylindrical coupling tube and a coupling arm of square-U-shape. The coupling tube is formed by pressing of a metal plate and has a slit in a radial direction and serrate grooves on the internal periphery, a pair of flanges formed integrally with said coupling tube at an end thereof on both sides of said slit, a screw hole formed on one of said flanges, and a hole formed on the other of said flanges coaxially with said screw hole for passing a bolt to engage with said screw hole. The coupling arm of square-U-shape is formed by pressing a metal plate and has a hole formed in the base portion of said coupling arm, and mutually coaxial circular holes formed on both ends of said coupling arm. The joint is assembled by fitting the other end of said coupling tube into the hole of said coupling arm and combining the other end of said coupling tube with the base portion of said coupling arm by welding, fitting by serration or fitting of different-shaped cross sections.

The method of the present invention for producing a yoke for universal joint consists of press forming a metal plate to form a cylindrical coupling tube having a slit in a radial direction, a pair of flanges integral with said tube at an end thereof and on both sides of said slit, and serrate grooves on the internal periphery; forming a screw hole on one of said flanges and a hole on the other of said flanges in coaxial manner with said screw hole for passing a bolt to engage with said screw hole; fitting the other end of said coupling tube into a hole formed at the base portion of a square-U-shaped coupling arm formed by pressing a metal plate and having mutually coaxial circular holes on both ends; and combining the other end of said coupling tube with the base portion of said coupling arm by welding, fitting by serration or fitting by different cross sections.

The yoke for universal joint of the present invention, produced by the above-explained method, requiring only two component parts which can both be prepared by press working, can reduce the cost of the product.

BRIEF DESCRIPTION OF THE DRAWINGS

FIGS. 1 and 2 illustrate a first embodiment of the present invention, wherein FIG. 1 is a partially cut-off lateral view, and FIG. 2 is a cross-sectional view along a line A-A in FIG. 1;

DESCRIPTION OF THE PREFERRED EMBODIMENTS

Now the present invention will be described in greater detail by way of exemplary embodiments thereof shown in the attached drawings.

Figure 1:
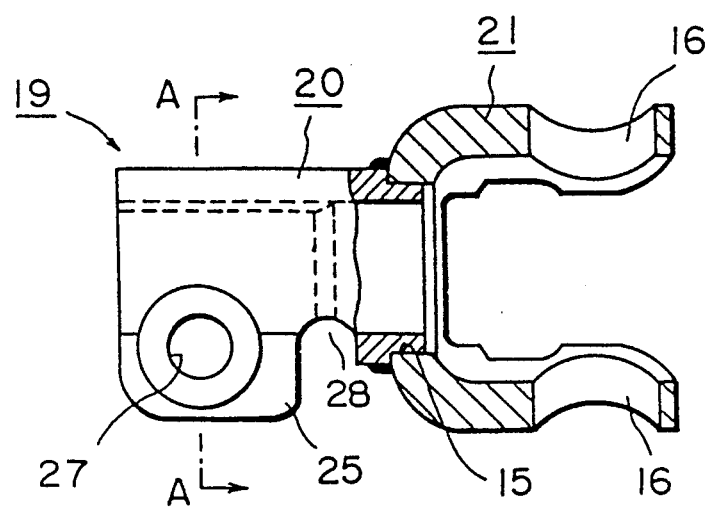
Figure 2:
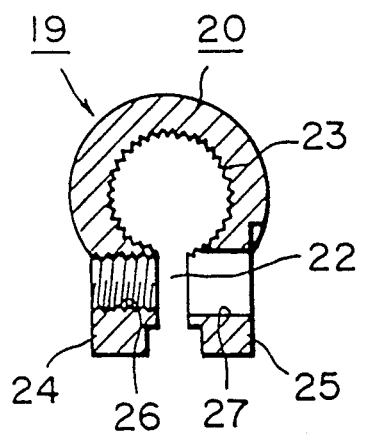

FIGS. 1 and 2 illustrate a first embodiment of the present invention, wherein FIG. 1 is a partially cut-off lateral view, and FIG. 2 is a cross-sectional view along a line A-A in FIG. 1.

The yoke 19 is formed by mutually fitting and welding two component parts, namely a coupling tube 20 and a coupling arm 21.

The coupling tube 20 is shaped in a cylindrical form by pressing a metal plate of sufficient rigidity such as a carbon steel plate, and is provided with a slit 22 in a radial direction, serrate grooves 23 on the internal periphery and an intermediate reentrant cut-out 28 on each side of the slit.

On an end (left-hand end in FIG. 1) of the above-mentioned coupling tube 20, there are integrally provided a pair of flanges 24, 25 positioned on both sides of said slit 22 adjacent to the cut-outs 28. Said flanges 24, 25 are made thicker by thickening a part of the metal plate constituting said coupling tube 20. One flange 24 (left in FIG. 2) is provided with a screw hole 26, while the other flange 25 (right in FIG. 2) is provided with a smooth hole 27. Said screw hole 26 and said smooth hole 27 are made mutually coaxial and the internal diameter of said hole 27 is made sufficiently larger than the diameter of the screw hole 26 and sufficiently smaller than the head of a bolt (not shown) whereby the front end of the bolt inserted into said hole 27 can be screwed into said screw hole 26.

The coupling arm 21 is shaped in U-form by pressing a metal plate of sufficient rigidity, such as a carbon steel plate.

Said coupling arm 21 is provided with a hole 15 at the base portion thereof and mutually coaxial circular holes 16, 16 on both ends thereof.

The yoke 19 for universal joint is obtained by fitting the other end (right-hand end in FIG. 1) of the coupling tube 20 into the hole 15 at the base portion of the coupling arm 21 and welding the external periphery of the other end of the coupling tube 20 to the periphery of said hole 15 at the base portion of the coupling arm 21.

Figure 5:
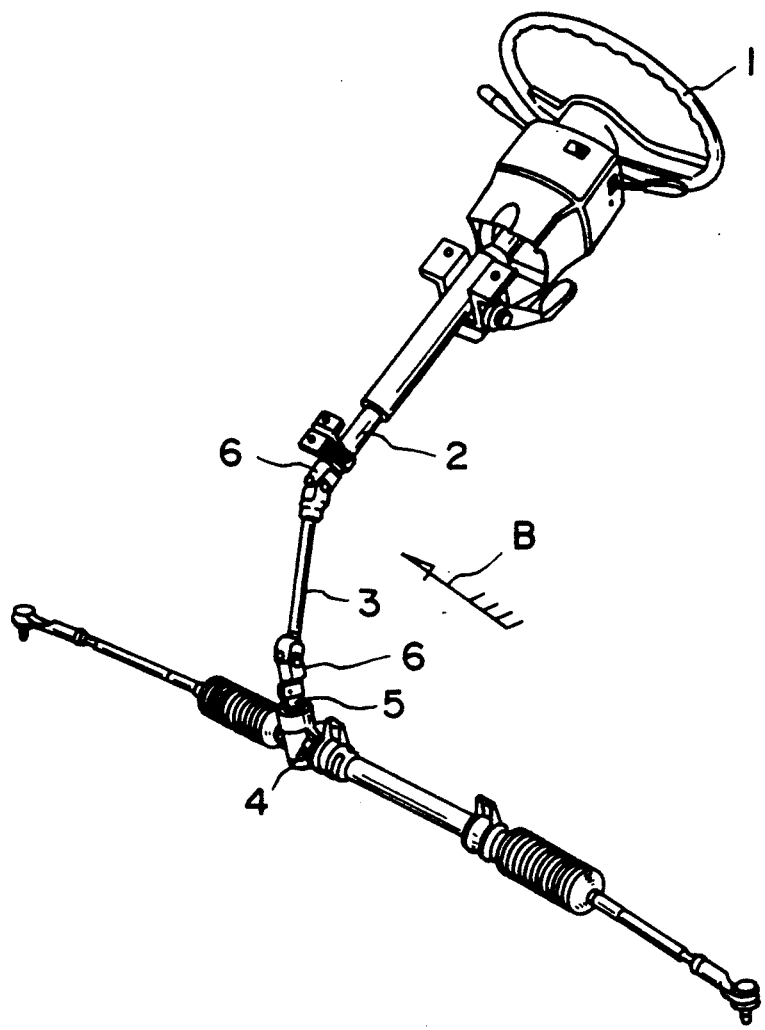
FIG. 5 is a perspective view of a steering device incorporating universal joints.
Figure 6:
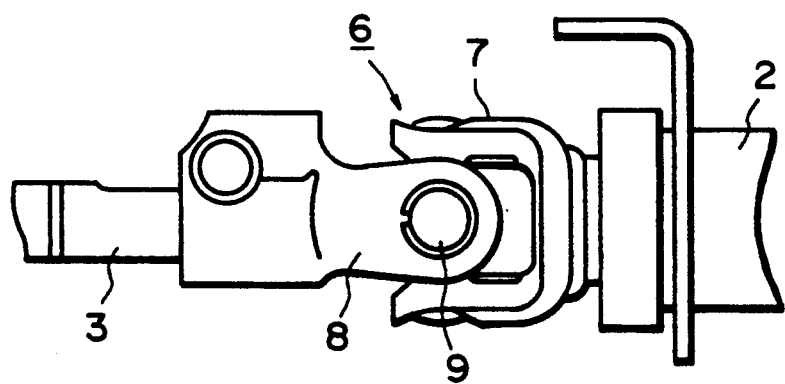
FIG. 6 is a magnified view of the device shown in FIG. 5, seen from a direction B.
Figure 7:
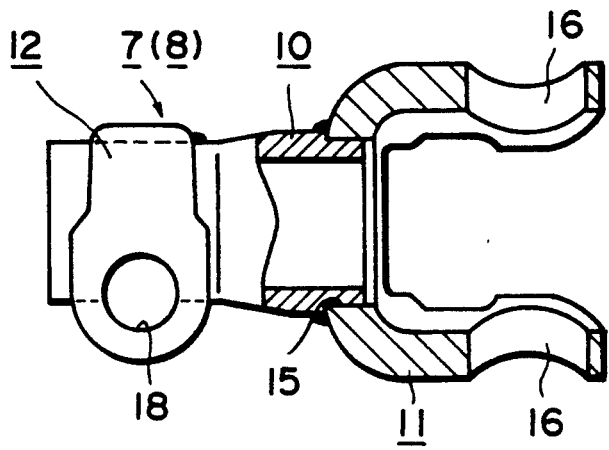
FIGS. 7 and 8 are views showing a yoke for conventional universal joint, in a similar manner as in FIGS. 1 and 2.
Figure 8:
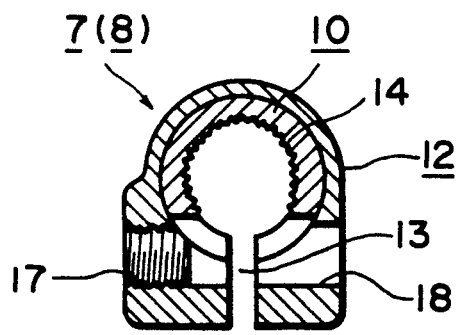

At the mutual welding of the coupling tube 20 and the coupling arm 21, the position of the coupling arm 21 and that of the flanges 24, 25 formed on the coupling tube 20 are suitably controlled in such a manner that the bolt provided between the flanges 24, 25 can be easily tightened in combining the end of the connecting rod 3 (FIG. 5) or the like to the yoke 19.

When the above-explained yoke of the present invention is connected, after being assembled in a universal joint, to the end of the connecting rod 3 (FIG. 5), a serrate portion formed on said end portion of the connecting rod 3 is inserted, into the coupling tube 20, and the aforementioned bolt is inserted into the hole 27 of the flange 25, from right in FIG. 2, screwed into the screw hole 26 of the flange 24 and tightened. Thus the yoke 19 and the end of said connecting rod 3 or the like are firmly combined.

The yoke of the present invention for universal joint, constructed and used as explained above, requires only two component parts, both of which can be prepared by press working, so that the cost of product can be reduced.

Figure 4:
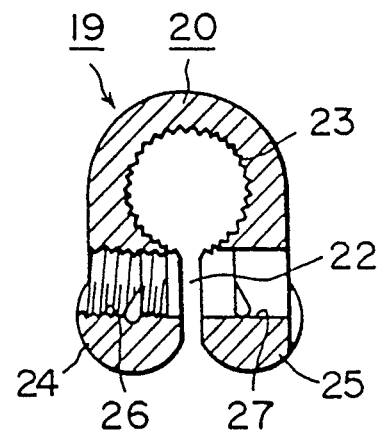
FIGS. 3 and 4 are similar views illustrating a second embodiment of the present invention.
Figure 3:
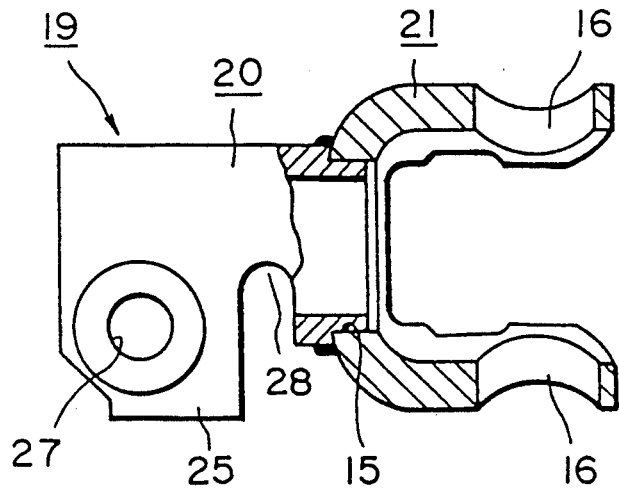

FIGS. 3 and 4 illustrate a second embodiment of the present invention.

In contrast to the foregoing first embodiment in which the flanges 24, 25 are made thicker by thickening a part of the metal plate constituting the coupling tube 20, the flanges 24, 25 in the present embodiment are made thicker by folding, by 180°, a part of the metal plate constituting the coupling tube 20.

Other structures and functions are the same as those in the foregoing first embodiment. Consequently, equivalent parts are represented by the same numbers, and will not be explained further.

The connection between the coupling arm 21 and the coupling tube 20 is not limited to the welding as explained above, but can also be achieved by mutual fitting of serrate grooves formed on the internal periphery of the hole 15 and on the external periphery of the end of the coupling tube 20, or by forming the internal periphery of the hole 15 and the external periphery of the end of the coupling tube 20 into different shapes and fitting the two. In these cases, the end of the coupling tube 20 may be spread, after fitting thereof, thereby preventing play in the fitted portion and obtaining a sufficiently firm connection.

The yoke of the present invention for universal joint and the method for producing the same require a reduced number of component parts and allow preparation of all the component parts by press working, thereby facilitating the production and administration of the component parts and enabling reduction of the cost of the product.

We claim:

1. A yoke for universal joint comprising:
   a cylindrical coupling tube formed by pressing a metal plate and having a slit in a radial direction, serrate grooves on the tube internal periphery, and an intermediate reentrant cut-out on each side of said slit;
   a pair of flanges integrally formed at an end of said coupling tube and on both sides of said slit adjacent to said cut-outs; and
   a coupling arm formed by pressing a metal plate into U-shape;
   wherein a screw hole is formed in one of said flanges and a hole coaxial with said screw hole is formed in the other of said flanges for passing a bolt to be screwed into said screw hole, and said coupling arm is provided with a hole in a base portion thereof and coaxially aligned circular holes in opposite end portions thereof; and
   wherein the other end of said coupling tube is fitted into said hole in said base portion and is connected thereto.

2. A yoke for universal joint according to claim 1, wherein said flanges are made thicker by thickening a part of the metal plate.

3. A yoke for universal joint according to claim 1, wherein said flanges are made thicker by folding, by 180°, respective parts of the metal plate.

4. A method for producing a yoke for universal joint, comprising steps of:

pressing a metal plate for forming a cylindrical coupling tube having a slit in a radial direction and a pair of flanges at an end thereof and on both sides of said slit adjacent to respective intermediate reentrant cut-outs of the tube, and further forming serrate grooves on the tube internal periphery;

forming a screw hole in one of said flanges and a hole coaxial with said screw hole in the other of said flanges, for passing a bolt to be screwed into said screw hole;

pressing a metal plate into U-shape for forming a coupling arm and further forming a hole in a base portion of said coupling arm and coaxially aligned circular holes in opposite ends of said coupling arm; and fitting the other end of said coupling tube into said hole in said base portion and connecting the other end of said coupling tube and said base portion of said coupling arm.

* * * * *